(12) United States Patent
Huynh et al.

(10) Patent No.: US 9,437,056 B2
(45) Date of Patent: Sep. 6, 2016

(54) METHODS AND APPARATUS FOR OPERATING FLIGHT CONTROL SYSTEMS OF AIRCRAFTS

(71) Applicant: The Boeing Company, Chicago, IL (US)

(72) Inventors: Neal V. Huynh, Bellevue, WA (US); Robert S. Eick, Seattle, WA (US); Thomas G. Heineman, Kent, WA (US); Michael D. Bills, Seattle, WA (US); Patrick M. Fahey, Seattle, WA (US); John C. Nicholas, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 53 days.

(21) Appl. No.: 14/511,036

(22) Filed: Oct. 9, 2014

(65) Prior Publication Data

US 2016/0104331 A1    Apr. 14, 2016

(51) Int. Cl.
| | |
|---|---|
| *B64C 13/16* | (2006.01) |
| *G07C 5/08* | (2006.01) |
| *B64C 13/10* | (2006.01) |
| *B64D 45/00* | (2006.01) |
| *B64C 13/28* | (2006.01) |
| *B64C 13/50* | (2006.01) |

(52) U.S. Cl.
CPC .............. *G07C 5/0808* (2013.01); *B64C 13/10* (2013.01); *B64C 13/16* (2013.01); *B64C 13/28* (2013.01); *B64C 13/503* (2013.01); *B64D 45/00* (2013.01); *B64D 2045/001* (2013.01); *B64D 2045/0085* (2013.01)

(58) Field of Classification Search
CPC ..... B64C 13/16; B64C 13/503; B64C 12/28; B64C 13/14

USPC ................... 701/3, 4, 16; 244/244, 194, 195
See application file for complete search history.

(56) References Cited

U.S. PATENT DOCUMENTS

| | | | |
|---|---|---|---|
| 4,472,780 A * | 9/1984 | Chenoweth .......... | G05D 1/0077 244/194 |
| 5,686,907 A | 11/1997 | Bedell et al. | |
| 2003/0127569 A1* | 7/2003 | Bacon ................. | G05D 1/0077 244/195 |
| 2005/0022590 A1 | 2/2005 | Huynh | |
| 2010/0145555 A1* | 6/2010 | Hagerott .................. | B64C 9/04 701/3 |
| 2010/0288886 A1 | 11/2010 | Schievelbusch et al. | |

FOREIGN PATENT DOCUMENTS

WO    2013162659    10/2013

OTHER PUBLICATIONS

"Model-based design," [http://en.wikipedia.org/wikilModel-based_design], accessed on Oct. 9, 2014, 5 pages.
European Patent Office, "Extended European Search Report", issued in connection with European Patent Application No. 15188129.9, issued on Mar. 7, 2016, 7 pages.

* cited by examiner

*Primary Examiner* — Tan Q Nguyen
(74) *Attorney, Agent, or Firm* — Hanley, Flight & Zimmerman, LLC (57) ABSTRACT

Methods and apparatus for operating flight control systems of aircrafts are disclosed. An example apparatus includes a flight control system including a first sensor and a second sensor. The example apparatus also includes a processor to, based on data from the first and second sensors, determine first and second input values and, based the input values, determine an approximate location of a jam in the flight control system of an aircraft.

17 Claims, 12 Drawing Sheets

METHODS AND APPARATUS FOR OPERATING FLIGHT CONTROL SYSTEMS OF AIRCRAFTS

FIELD OF THE DISCLOSURE

This disclosure relates generally to aircrafts and, more particularly, to methods and apparatus for operating flight control systems of aircrafts.

BACKGROUND

Some aircraft include primary flight control systems that may be used to control the attitude and flight path of the aircraft. In some instances, a jam may occur within the primary flight control system that impairs the primary flight control system.

DETAILED DESCRIPTION

The examples disclosed herein relate to safety apparatus that enhance the mechanics of primary flight control systems and enhance the operational safety associated with such flight control systems. In some examples, aircraft primary flight controls include longitudinal, lateral and directional aerodynamic control surfaces and devices to control the position these control surfaces to provide aircraft control, trim and/or stability. In some examples, the example safety apparatus identifies the location of a jam in a primary flight control system and, based on the location identified, commands the wing spoilers and/or other control surfaces to mitigate the jam. The disclosed examples may be employed in any suitable aircraft such as an aircraft (e.g., air plane) having a control system with a forward jam override device but not a rear jam override device. For example, the control system may be an example elevator control system, an example directional control system and/or an example lateral control system. In some examples, the elevator control system includes control columns associated with the pilot and/or first officer. In some examples, the directional control system includes rudder pedals associated with the pilot and/or first officer. In some examples, the lateral control system includes control wheel(s) associated with the pilot and/or first officer. The term "jam" as used herein refers to a condition in which the movement of one or more components becomes impaired. Thus, the disclosed safety apparatus are configured to compensate for any impaired responsiveness of one or more components.

In examples in which the control system is implemented as an elevator control system, a forward jam may exist when a jam (e.g., a mechanical jam) is located forward of the pilot control column or the first officer control column. Without decoupling the control columns, when a forward jam exists, movement of both the control columns may be impaired. In some examples, when a forward jam is detected, a forward jam override device decouples the control columns to enable the non-jammed controller to move independently of the jammed controller. The non-jammed control column is able to control the aircraft when a forward jam exists because a forward jam does not substantially impair the aft elevator control system components from moving the elevators, etc. Thus, once the forward jam override device decouples the jammed control column from the non-jammed control column, the non-jammed control column and the aft components of the control system can control the aircraft.

In examples in which the control system is implemented as an elevator control system, an aft jam of the elevator control system exists when a jam is located aft of the pilot control column and/or the first officer control column. An aft jam may impair the movement of at least one of the aft components (e.g., elevator control rod, elevator, etc.) of the elevator control system in response to an input from one or both of the control columns.

In examples in which the control system is implemented as an elevator control system, the example elevator control system may use inputs from column force sensors to differentiate between forward and aft jams. In some examples, to identify or determine the presence of and/or location of an elevator jam, first and second column force sensors are used to determine input force value(s) from respective control columns (e.g., a captain column, a first officer column) of the aircraft. The first and second force sensors may be positioned below the cockpit floor. Using the examples disclosed herein in combination with a model-based design method, the summation of input force values obtained via the first and second force sensors can be used to differentiate between aft and forward jams of the elevator control system. In some examples, if a jam is identified as an aft jam, a direct lift control command is used to command a spoiler (e.g., a fly-by-wire spoiler) to mitigate the elevator jam. In such examples, the direct lift control command may be substantially equal to the pilot input force values and/or the summed force values for the sensors. In some examples, if a jam is identified as a forward jam, a zero force output is used as to not interfere with a forward jam override device of the mechanical control system.

To account for sensor error and/or hysteresis, a dead zone (e.g., ten pounds, first predetermined value, a minimum predetermined value) may be removed from the summed input force value. In some examples, removing the dead zone also accounts for biases (e.g., a jam bias force) that may be present within the summed input force value. A bias force may be associated with an off-neutral jam when the control column(s) is in an off-neutral position. Specifically, when a forward jam is off-neutral, an applied restoring force of a feel and centering system may cause the summed input force values from the first and second force sensors to be greater than a trigger force without the pilot(s) being in-the-loop. The phrase "in-the-loop" as used herein refers to the pilot actively trying to overcome a jam of the elevator control system. If the bias force is not accounted for and/or removed, an erroneous direct lift control (DLC) command may be generated. If the summed input force value is above a predetermined value (e.g., saturated), the portion of the summed input force value greater than a predetermined value (e.g., thirty five pounds) may be ignored.

Based on system simulation and test results of different jam locations, different jam positions and/or different feel pressures, for aft jams, the force sensor sum may be greater than a predetermined value (e.g., ten pounds). A force sensor sum greater than a predetermined value substantially ensures that the pilot(s) is in-the-loop actively trying to overcome the jam. In such examples, the force sensor sum may be substantially equal to the pilot input force value. Thus, using the force sensor sum, the location of the jam may be identified as being an aft jam and, thereafter, a direct lift control (DLC) command can be determined to mitigate the elevator jam. In some examples, if an aft jam is detected, the determined direct lift control command can be used to command the wing spoilers of the aircraft to move and control the aircraft.

Based on system simulation and test results of different jam locations, different jam positions and/or different feel pressures, for forward jams, the force sensor sum may be approximately less than 10 lbs. Thus, using the force sensor sum, the location of the jam may be identified as being a forward jam and, thereafter, a forward jam override device may be used to mitigate the elevator jam.

Figure 1:
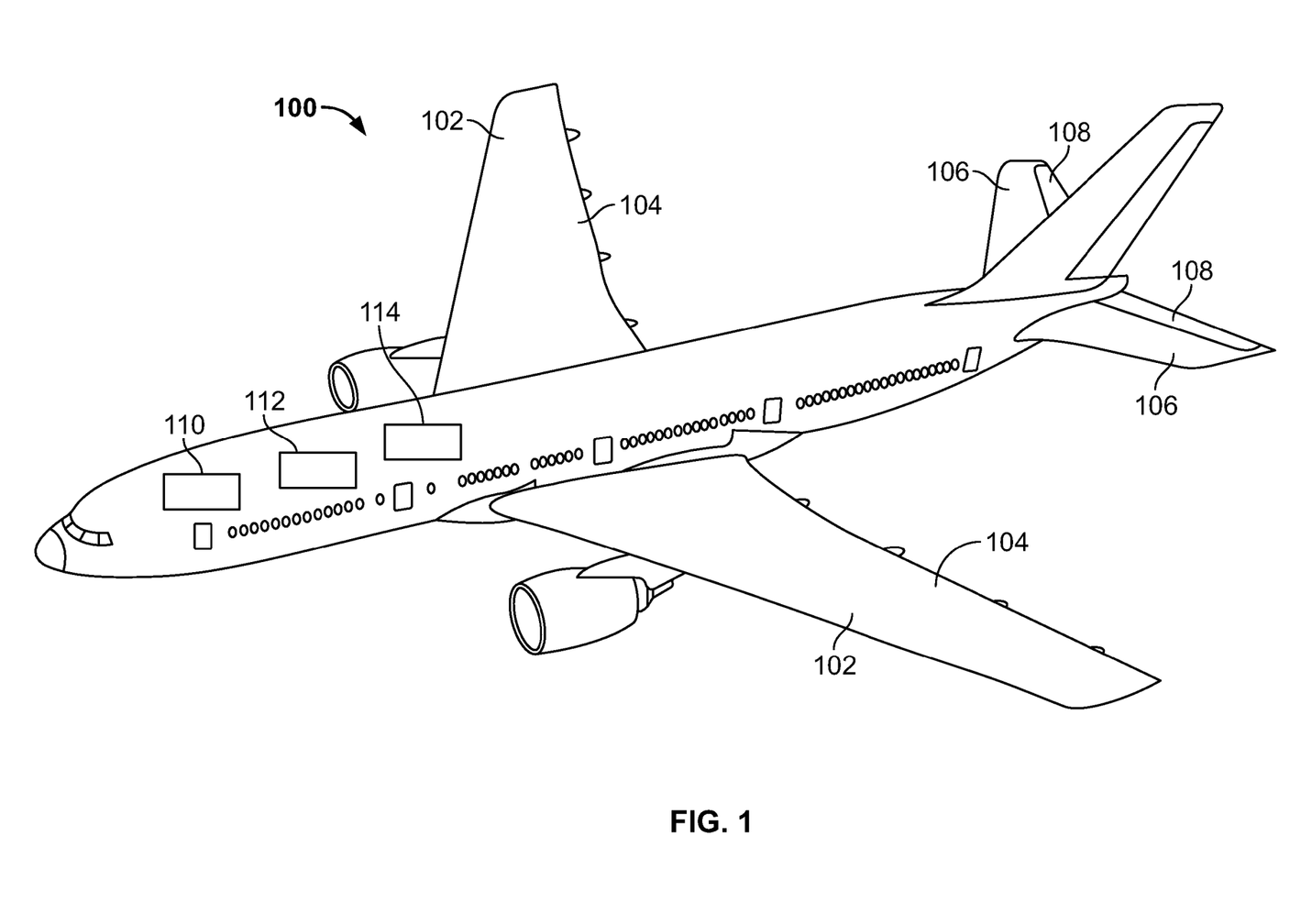
FIG. 1 illustrates an aircraft on which the examples disclosed herein can be implemented.

FIG. 1 shows an example aircraft 100 that can be used to implement the examples disclosed herein. The aircraft 100 includes wings 102 having spoilers 104 and a horizontal stabilizer 106 including elevators 108. In some examples, the aircraft 100 includes an example elevator control system and/or longitudinal control system 110, an example lateral control system 112 and/or an example directional control system 114. The elevator control system 110 may be a mechanical elevator control system or a fly-by-wire elevator control system.

In some examples, based on sensor inputs, the example elevator control system 110 can detect and determine the location of a jam in the elevator control system 110. The sensors may be associated with control columns of the elevator control system 110. In some examples, the jam is a forward jam when a summation of the sensor inputs is less than a predetermined value (e.g., ten pounds) and the jam is an aft jam when the summation of the sensor inputs is greater than a predetermined value. In some examples, if a forward jam is detected, the elevator control system 110 decouples the control columns to enable the non-jammed control column to move independently of the jammed control column.

In some examples, based on sensor inputs, the example lateral control system 112 can detect and determine the location of a jam in the lateral control system 112. The sensors may be associated with control wheels of the lateral control system 110. In some examples, the jam is a forward jam when a summation of the sensor inputs is less than a predetermined value and the jam is an aft jam when the summation of the sensor inputs is greater than a predetermined value. In some examples, if a forward jam is detected, the lateral control system 110 decouples the control wheels to enable the non-jammed control wheel to move independently of the jammed control wheel. The equations and methods disclosed herein in connection with the example elevator control system can also be used to implement the example lateral control system 110.

In some examples, based on sensor inputs, the example directional control system 114 can detect and determine the location of a jam in the directional control system 112. The sensors may be associated with the directional control system 112. In some examples, the jam is a forward jam when a summation of the sensor inputs is less than a predetermined value and the jam is an aft jam when the summation of the sensor inputs is greater than a predetermined value. In some examples, if a forward jam is detected, the directional control system 112 decouples the rudder pedals to enable the non-jammed rudder pedal to move independently of the jammed rudder pedal. The equations and methods disclosed herein in connection with the example elevator control system can also be used to implement the example directional control system 110.

Figure 2:
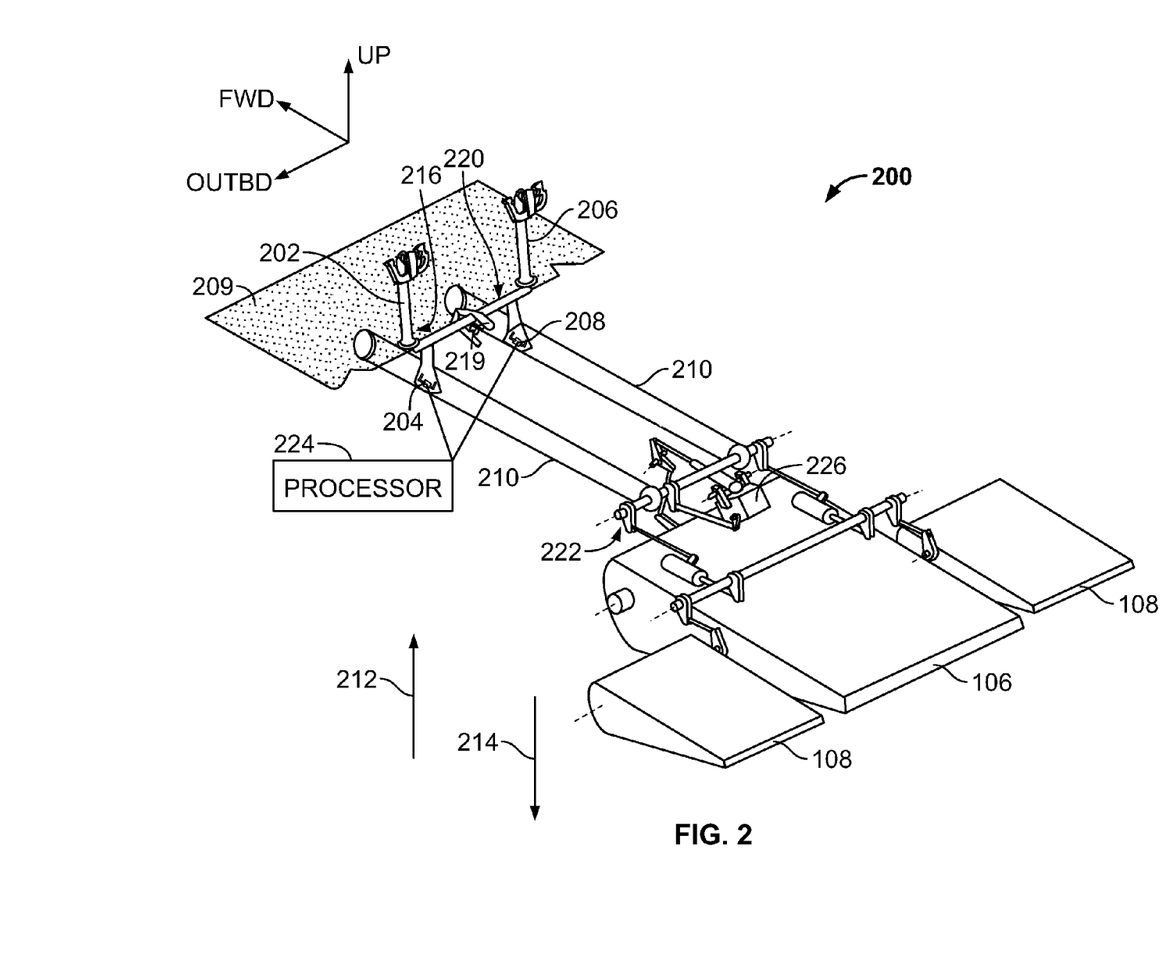
FIG. 2 illustrates an example elevator system that can be used to implement the example aircraft of FIG. 1.

As shown in FIG. 2, to control at least portions of the aircraft 100, the aircraft 100 includes an example mechanical elevator control system 200 that can be used to implement the elevator control system 110 of FIG. 1. The mechanical elevator control system 200 is operatively associated with a pilot control column 202 and a first sensor 204 and a first officer control column 206 and a second sensor 208. In this example, the first and second sensors 204, 208 are located below a cockpit floor 209 of the aircraft 100. The first sensor 204 is configured to sense a pilot input force value (e.g., a torque) from the pilot control column 202 and the second sensor 208 is configured to sense a pilot input force value (e.g., a torque) from the first officer control column 206.

The elevators 108 are connected to the control columns 202, 206 via linkage 210. In some examples, if the control columns 202, 206 are pulled rearwardly, the elevators 108 are moved in a direction generally indicated by arrow 212 and if the control columns 202, 206 are pushed forward, the elevators 108 are moved in a direction generally indicated by arrow 214. However, if a jam occurs within the mechanical elevator control system 200, when the pilot and/or the first officer applies a force to their respective control columns 202, 206, the corresponding movement of the elevator 108 is impaired.

If a forward jam exists for the pilot control column 202, the jam may be located forward of the first sensor 204 adjacent reference number 216. If the pilot control column 202 jams, movement of the pilot control column 202 is substantially impaired. To enable the elevators 108, etc., to be moved and/or controlled when the pilot control column 202 is jammed, a forward jam override device 219 decouples the control columns 202, 206 enabling movement of the first officer control column 206, the linkage 210 and the elevators 108, etc.

If a forward jam exists for the first officer control column 206, the jam may be located forward of the second force sensor 208 adjacent reference number 220. If the first officer column 206 jams, movement of the first officer control column 206 is impaired. To enable the elevators 108, etc. to be moved and/or controlled when the first officer column 206 is jammed, the forward jam override device 219 decouples the control columns 202, 206 enabling movement of the pilot control column 204, the linkage 210 and the elevators 108, etc.

If an aft jam exists, the jam may be located aft of the first sensor 204 adjacent reference number 222. When an aft jam exists, the control columns 202 and/or 206 may be movable by tensioning the linkage 210, but this movement does not correspondingly move, for example, the elevators 108 as expected. Decoupling the control columns 202, 206 does not enable the aft components of the elevator control system 200 to be controlled when an aft jam is present. Thus, the forward jam override device 219 may only enable elevator motion by decoupling the control columns 202, 206 when a forward jam exists.

As discussed in more detail below, using the examples disclosed herein, a processor 224 can differentiate between a forward jam and an aft jam by processing inputs from the first and/or second sensors 204, 208. If a forward jam is detected, in some examples, the processor 224 communicates with the forward override device 219 and the forward override device 219 decouples the control columns 202, 206. If an aft jam is detected, in some examples, the processor 224 commands the wing spoilers 104 to move, thereby compensating for the impaired ability to move the aft components of the elevator control system because of the aft jam.

In this example and as shown in Equation 1, the processor 224 can determine the location of the jam based on the summation of the input force values measured by the first and second sensors 204, 208.

$$F_{sum} = F_{first\ sensor} + F_{second\ sensor} \quad \text{Equation 1:}$$

As shown in Equation 2, in some examples, an aft jam may be identified when the summation of the force values from the first and second sensors 204, 208 is greater than a predetermined value (e.g., ten lbs.). In some examples, for aft jams, the summation of the force values may approximately equal the input force value. The phrase "substantially equal" as used herein refers to a condition in which there is no significant difference between the summation of the force values and the input force value. As shown in Equation 3, in some examples, a forward jam may be identified when the summation of the force values from the first and second sensors 204, 208 is less than a predetermined value. In some examples, for forward jams, the summation of the force values may be approximately less than 10 lb.

$$\text{Aft Jam} = F_{sum} > \text{predetermined value} \quad \text{Equation 2:}$$

$$\text{Forward Jam} = F_{sum} \leq \text{predetermined value} \quad \text{Equation 3:}$$

If the location of the jam is identified as a forward jam, the processor 224 communicates with the forward jam override device 219 and the forward override device mitigates the jam. As shown in Equation 4, if the location of the jam is identified as an aft jam, to account for sensor error and/or hysteresis, a direct lift control command value may be determined by the processor 224 by removing a dead zone value (e.g., ten pounds) from the summed input force value. The determined direct lift command value may be used to command the wing spoilers 104 to control the aircraft 100. Including such a dead zone may also account for a bias introduced into the force values of the first and second sensors 204, 208 when a forward jam is off-neutral and a feel and centering system 226 provides a restoring force that causes the summation of the force values from the first and second sensors 204, 208 to exceed a trigger force with the possibility of the pilots not being in-the-loop. If such a jam bias force is introduced, the processor 224 may generate an erroneous direct lift control (DLC) command. However, by removing the dead zone value from the summed input force, the processor 224 also removes any jam bias force from the summation of inputs received by the first and/or second sensors 204, 208.

$$\text{DLC Command} = F_{sum} - F_{deadzone} \quad \text{Equation 4:}$$

While an example manner of implementing the processor 224 and the mechanical elevator control system 200 is illustrated in FIG. 2, one or more of the elements, processes and/or devices illustrated in FIG. 2 may be combined, divided, re-arranged, omitted, eliminated and/or implemented in any other way. Further, the processor 224 and the example mechanical elevator control system 200 of FIG. 2 may be implemented by hardware, software, firmware and/or any combination of hardware, software and/or firmware. Thus, for example, any of the example the processor 224 and the mechanical elevator control system 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 224 or the example mechanical elevator control system 200 is/are hereby expressly defined to include a tangible computer readable storage device or storage disk such as a memory, a digital versatile disk (DVD), a compact disk (CD), a Blu-ray disk, etc. storing the software and/or firmware. Further still, the example mechanical elevator control system 200 of FIG. 2 may include one or more elements, processes and/or devices in addition to, or instead of, those illustrated in FIG. 2, and/or may include more than one of any or all of the illustrated elements, processes and devices.

Figure 3:
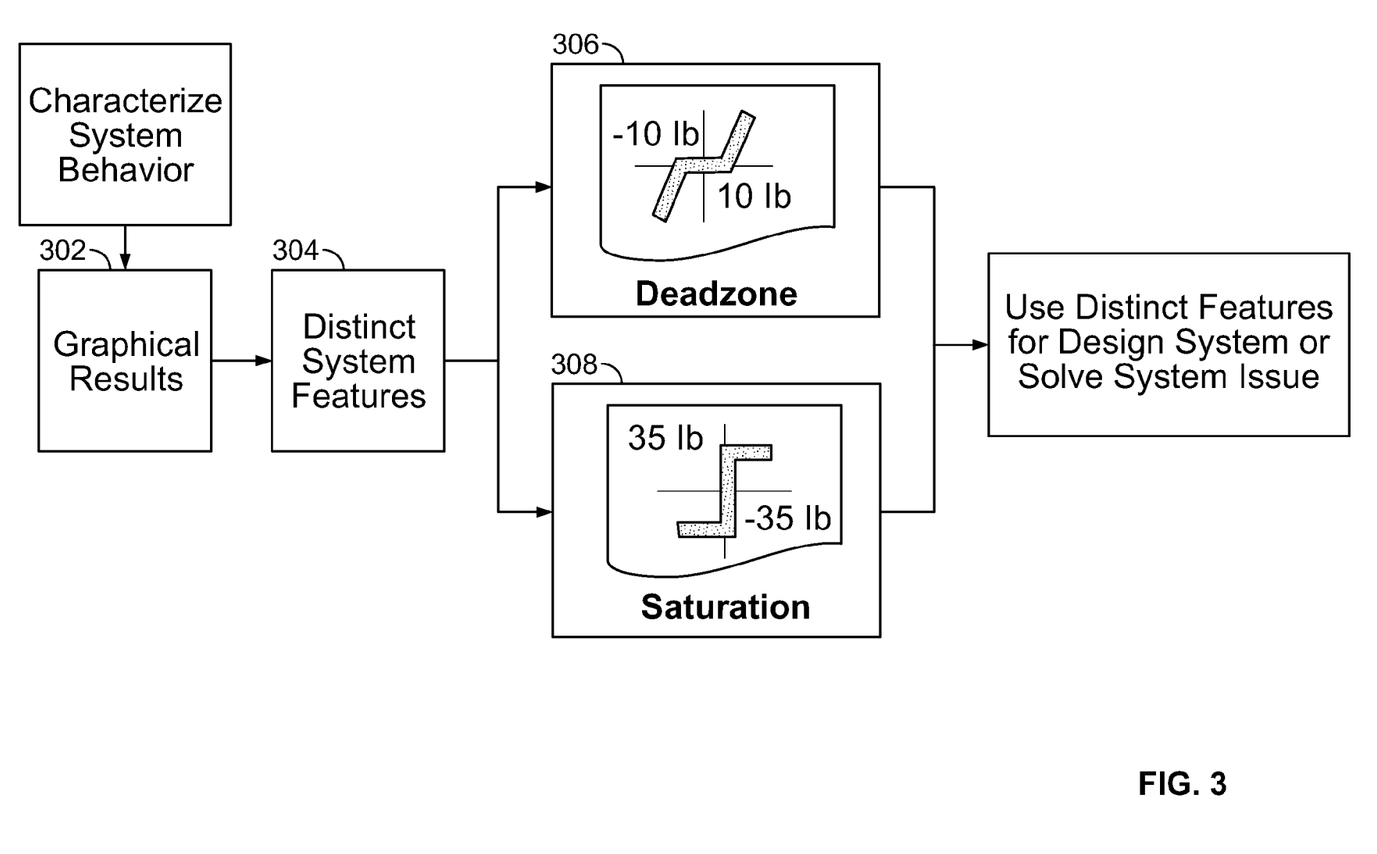
FIG. 3 illustrates an example process to identify distinctive features that can be used for implementing the example aircraft of FIG. 1.

FIG. 3 illustrates a flow diagram representing a model-based design approach used to implement the examples disclosed herein. Block 302 represents the graphical results of the system characteristics based on the simulation and test results and the response from sensors 204, 208 (e.g., see graphs of FIGS. 6-13). Block 304 represents the distinct system features based on the graphical results. Block 306 represents the dead zone that is accounted for when determining the direct lift control command. In some examples, the dead zone is accounted for by removing the predetermined dead zone value from the summed input forces from the first and second sensors 204, 208. Block 308 represents the maximum and/or saturation value above which the processor 224 may ignore values greater than the maximum and/or saturation value (e.g., second predetermined value, maximum predetermined value). For example, if the direct lift control command is forty pounds and the maximum and/or saturation value is thirty five pounds, the processor 224 may use thirty five pounds as the direct lift control command and ignore the additional summed input force value between thirty five pounds and forty pounds.

A flowchart representative of an example method for implementing the mechanical elevator control system 200 of FIG. 2 is shown in FIGS. 4-7. In this example, the method may be implemented using machine readable instructions that comprise a program for execution by a processor such as the processor 1412 shown in the example processor platform 1400 discussed below in connection with FIG. 16. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIGS. 4-7, many other methods of implementing the example mechanical elevator control system 200 may alternatively be used. For example, the order of execution of the blocks may be changed, and/or some of the blocks described may be changed, eliminated, or combined.

As mentioned above, the example method of FIGS. 4-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
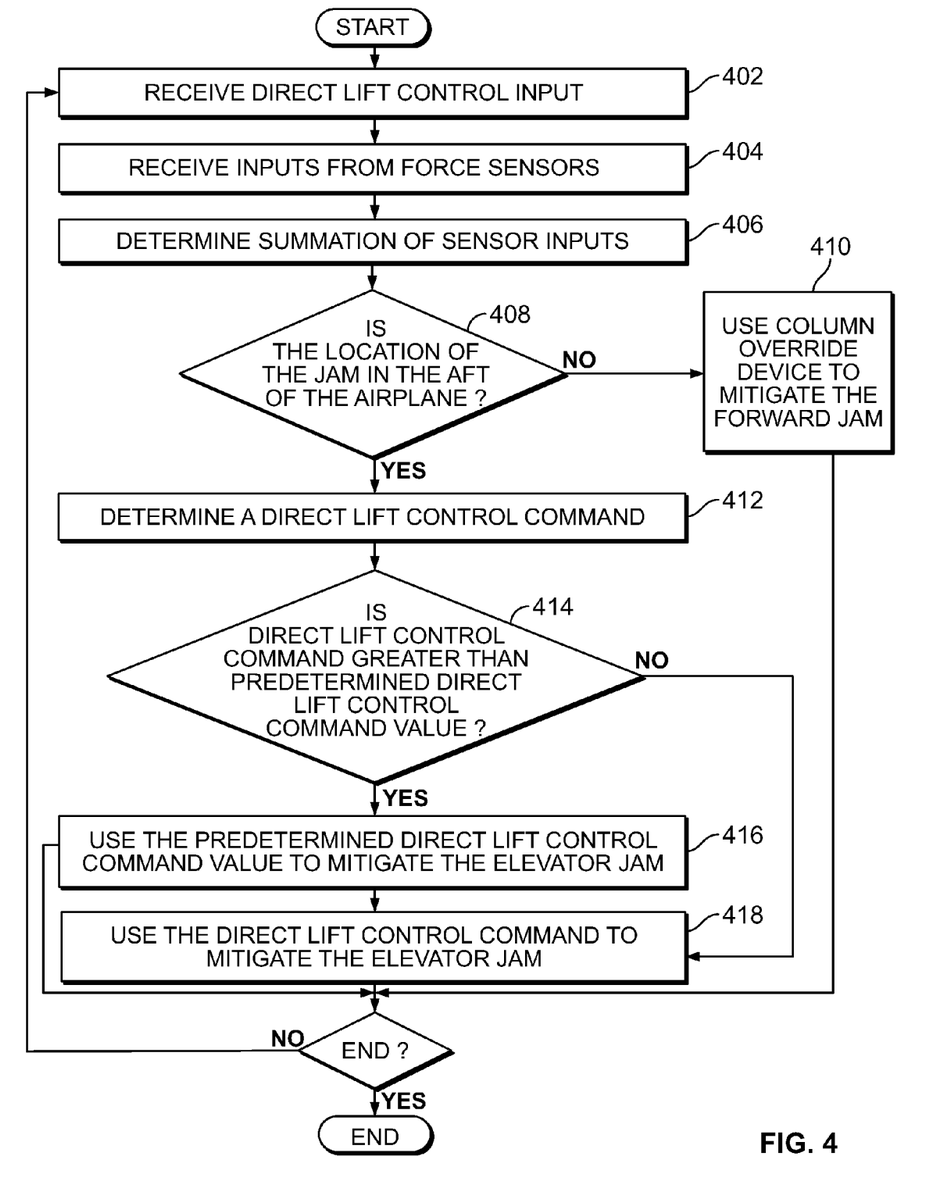
FIG. 4 illustrates an example flowchart representative of an example method that may be used to implement the elevator system of FIGS. 1 and/or 2.
Figure 5:
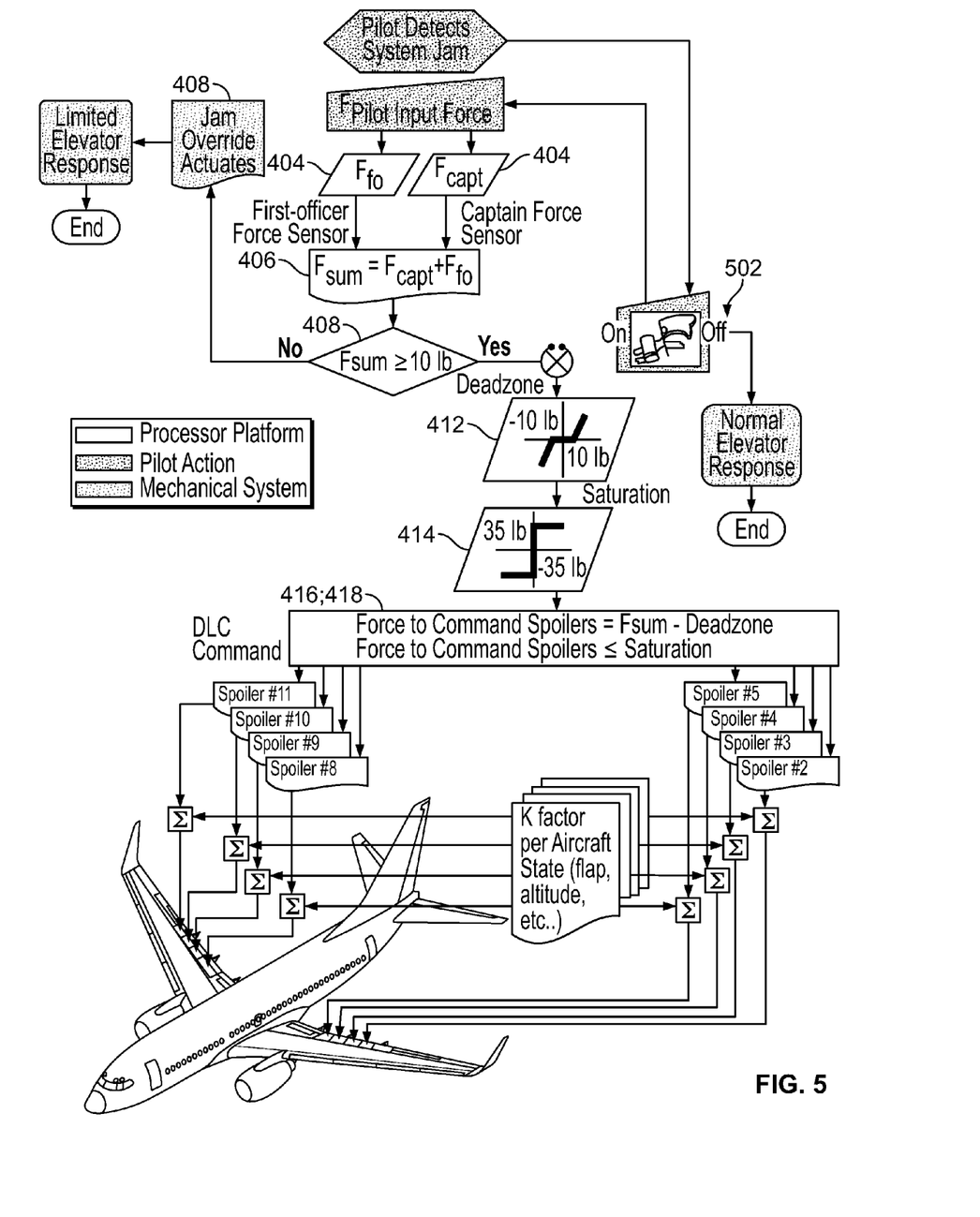
FIG. 5 illustrates additional details of the example method of FIG. 4.

FIGS. 4 and 5 will be described in combination where FIG. 4 shows a method and FIG. 5 shows a flow diagram corresponding to the method of FIG. 4. The example method of FIG. 4 begins when the pilot switches on and/or enables a direct lift control switch 502 (FIG. 5) and the processor 224 receives a direct lift control input (block 402). The processor 224 then obtains first and second force values from the first and second sensors 204, 208 (block 404). In this example, the first sensor 204 is associated with the pilot control column 202 and the second sensor 208 is associated with the first officer's column 206.

The processor 224 then sums the first and second force values to determine a summed force value, $F_{sum}$, (block 406). At block 408, the processor 224 determines if the jam is an aft jam. In some examples, the processor 224 determines that the jam is an aft jam if the summed force value, $F_{sum}$, is greater than a predetermined value (e.g., ten pounds). If the jam is determined not to be an aft jam (e.g., a forward jam), the processor 224 enables the column override device (e.g., the forward jam override device 219) to mitigate the forward jam (block 410). However, if the processor 224 determines the location of the jam as being an aft jam, a direct lift control (DLC) command can be determined by the processor 224 (block 412). In some examples, the DLC command is determined by subtracting a dead zone value from the summed force value. The processor 224 then determines if the DLC command is above a predetermined value (e.g., thirty five pounds) (block 414). If the DLC command is above the predetermined value, the predetermined value is used (not the determined DLC command) to command the wing spoilers 104 of the aircraft 100 to move and control the aircraft 100 (block 416). However, if the DCL command is equal to or below the predetermined value, the DCL command is used to command the wing spoilers 104 of the aircraft 100 to move and control the aircraft 100 (block 418).

Figure 6:
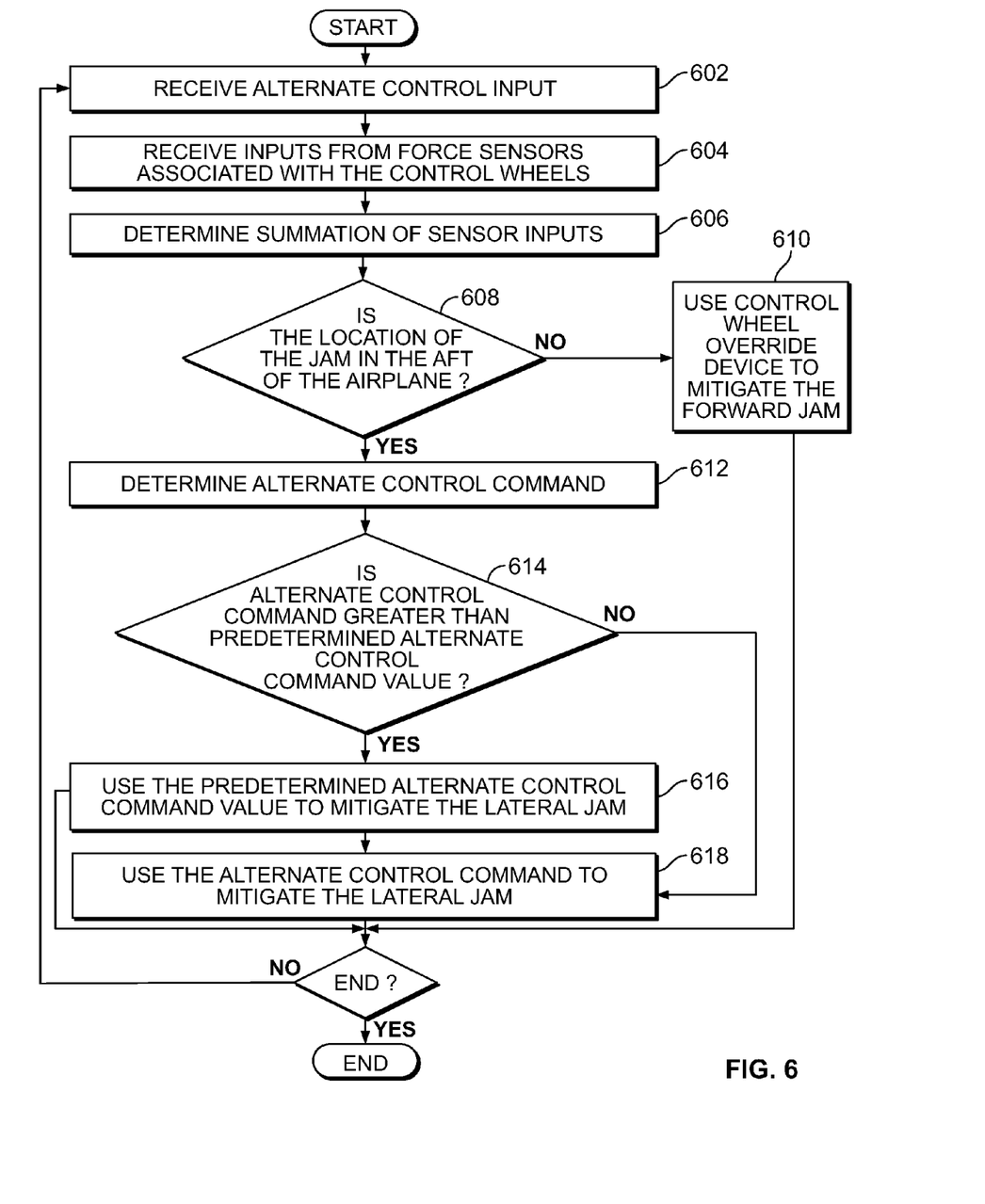
FIG. 6 illustrates an example flowchart representative of an example method that may be used to implement the lateral control system of FIG. 1.

The example method of FIG. 6 may be used to mitigate lateral jams (e.g., aileron jam, spoiler jam) using, for example, the rudder of the aircraft 100. The example method begins when the pilot switches on and/or enables an alternate control switch and the processor 1412 receives an alternate control input (block 602). The processor 1412 then obtains first and second force values from the first and second sensors associated with the control wheels (block 604). In this example, the first sensor is associated with the pilot and/or the pilot control column 202 and the second sensor is associated with the first officer and/or the first officer's column 206.

The processor 1412 then sums the first and second force values to determine a summed force value, $F_{sum}$, (block 606). At block 608, the processor 1412 determines if the jam is an aft jam. In some examples, the processor 1412 determines that the jam is an aft jam if the summed force value, $F_{sum}$, is greater than a predetermined value. If the jam is determined not to be an aft jam (e.g., a forward jam), the processor 1412 enables the control wheel override device to mitigate the forward jam (block 610). However, if the processor 1412 determines the location of the jam as being an aft jam, an alternate control command can be determined by the processor 1412 (block 612). In some examples, the alternate control command is determined by subtracting a dead zone value from the summed force value. The processor 1412 then determines if the alternate control command is above a predetermined value (block 614). If the alternate control command is above the predetermined value, the predetermined value is used (not the determined alternate control command) to command the rudder of the aircraft 100 to move and control the aircraft 100 (block 616). However, if the alternate control command is equal to or below the predetermined value, the alternate control command is used to command the rudder of the aircraft 100 to move and control the aircraft 100 (block 618).

Figure 7:
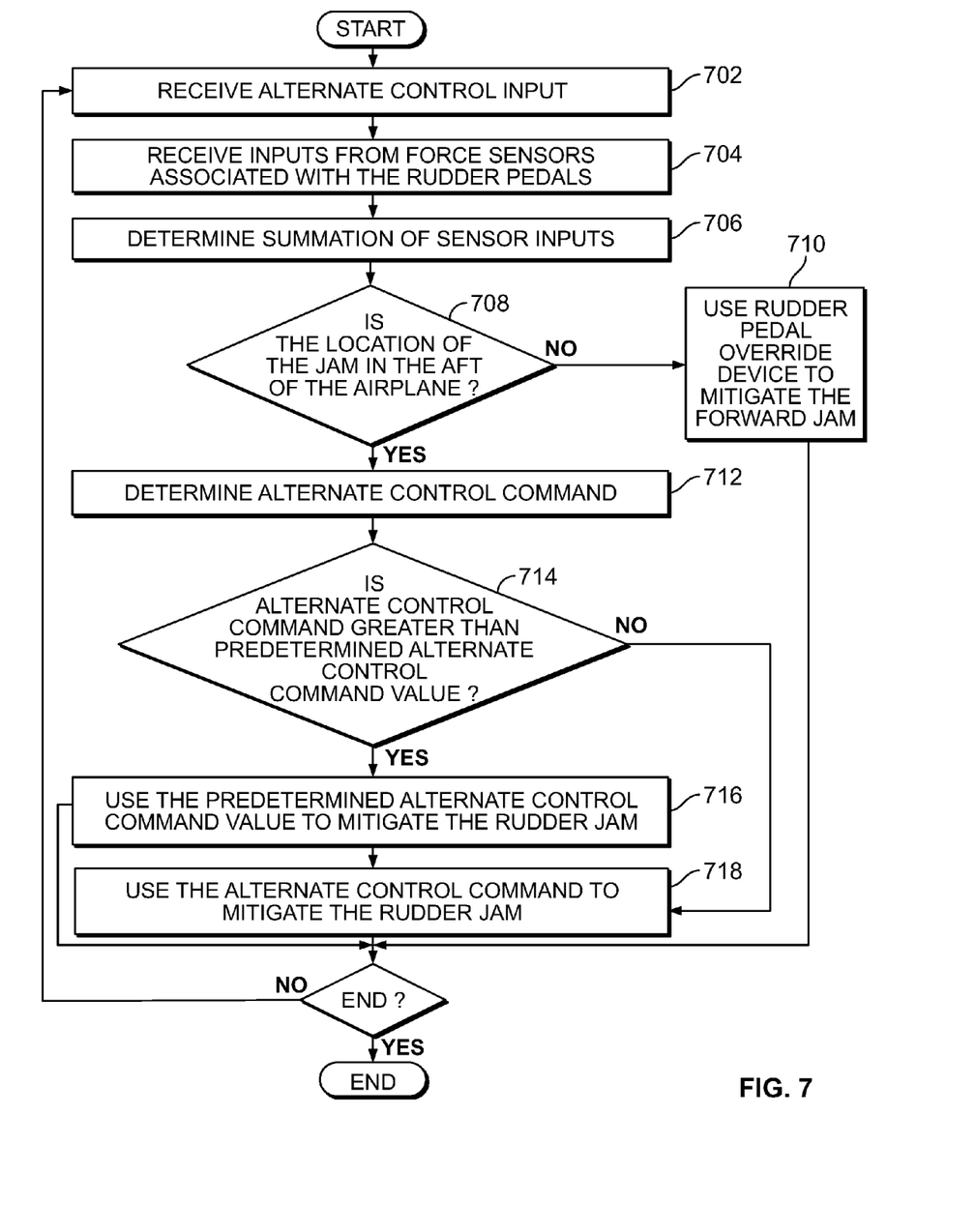
FIG. 7 illustrates an example flowchart representative of an example method that may be used to implement the directional control system of FIG. 1.

The example method of FIG. 7 may be used to mitigate directional jams (e.g., rudder jam) using, for example, the aileron and/or the spoilers of the aircraft 100. The example method begins when the pilot switches on and/or enables an alternate control switch and the processor 1412 receives an alternate control input (block 702). The processor 1412 then obtains first and second force values from the first and second sensors associated with the control wheels (block 704). In this example, the first sensor is associated with the pilot's rudder pedals and/or the pilot control column 202 and the second sensor is associated with the first officer's rudder pedals and/or the first officer's column 206.

The processor 1412 then sums the first and second force values to determine a summed force value, $F_{sum}$, (block 706). At block 708, the processor 1412 determines if the jam is an aft jam. In some examples, the processor 1412 determines that the jam is an aft jam if the summed force value, $F_{sum}$, is greater than a predetermined value. If the jam is determined not to be an aft jam (e.g., a forward jam), the processor 1412 enables the rudder pedal override device to mitigate the forward jam (block 710). However, if the processor 1412 determines the location of the jam as being an aft jam, an alternate control command can be determined by the processor 1412 (block 712). In some examples, the alternate control command is determined by subtracting a dead zone value from the summed force value. The processor 1412 then determines if the alternate control command is above a predetermined value (block 714). If the alternate control command is above the predetermined value, the predetermined value is used (not the determined alternate control command) to command the ailerons and/or spoilers of the aircraft 100 to move and control the aircraft 100 (block 716). However, if the alternate control command is equal to or below the predetermined value, the alternate control command is used to command the aileron and/or the spoilers of the aircraft 100 to move and control the aircraft 100 (block 718).

Figure 8:
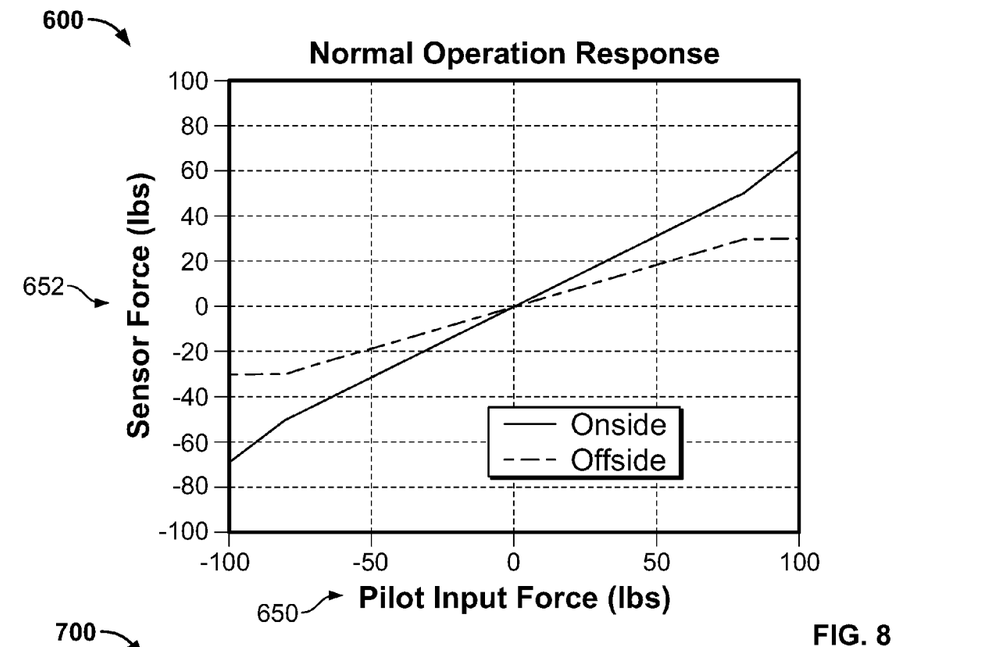
FIGS. 8-15 are graphs generated in connection with the examples disclosed herein.
Figure 9:
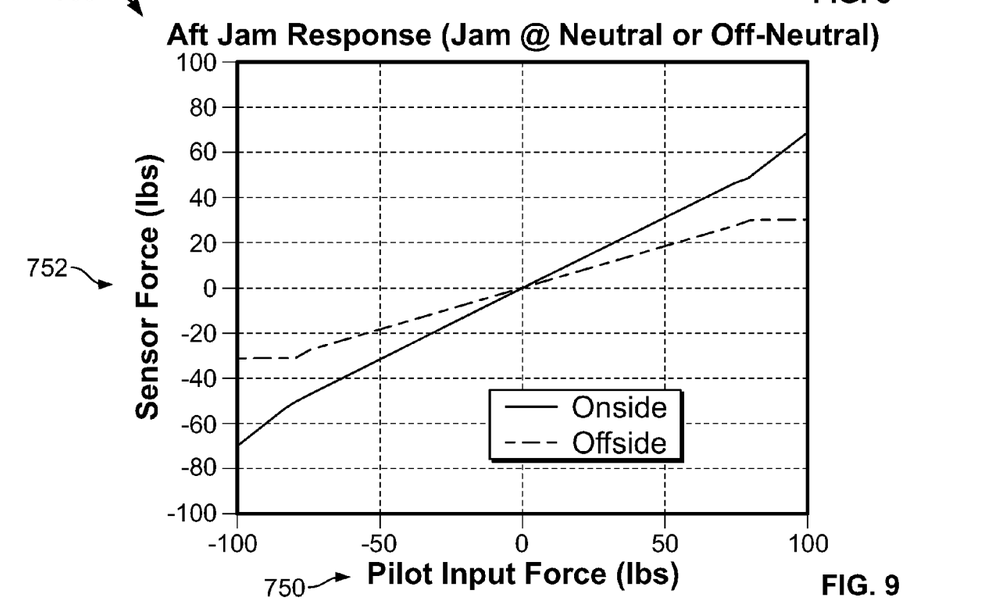
Figure 10:
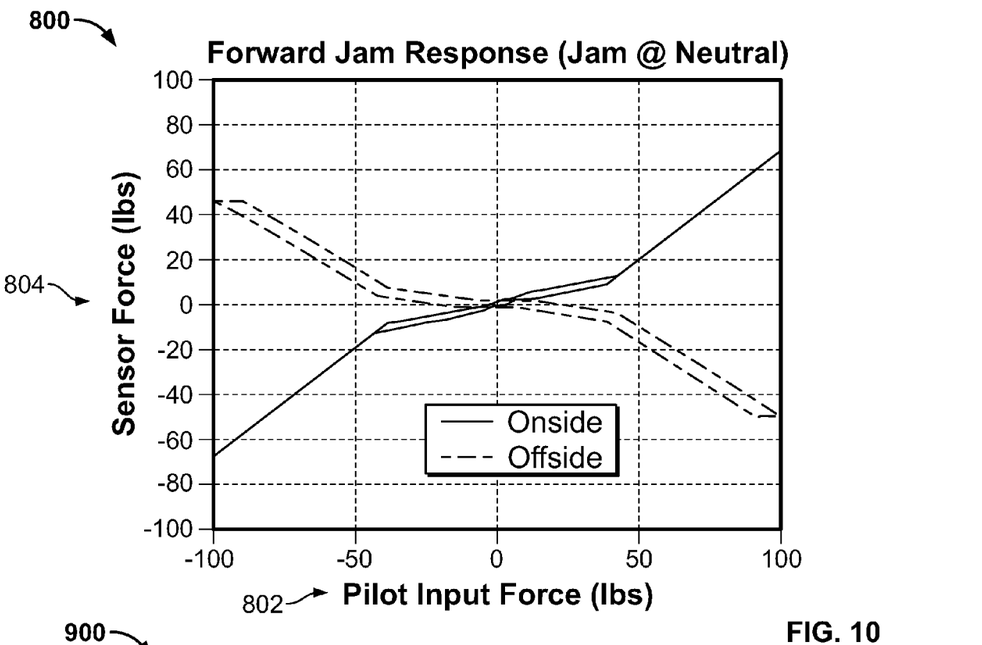
Figure 11:
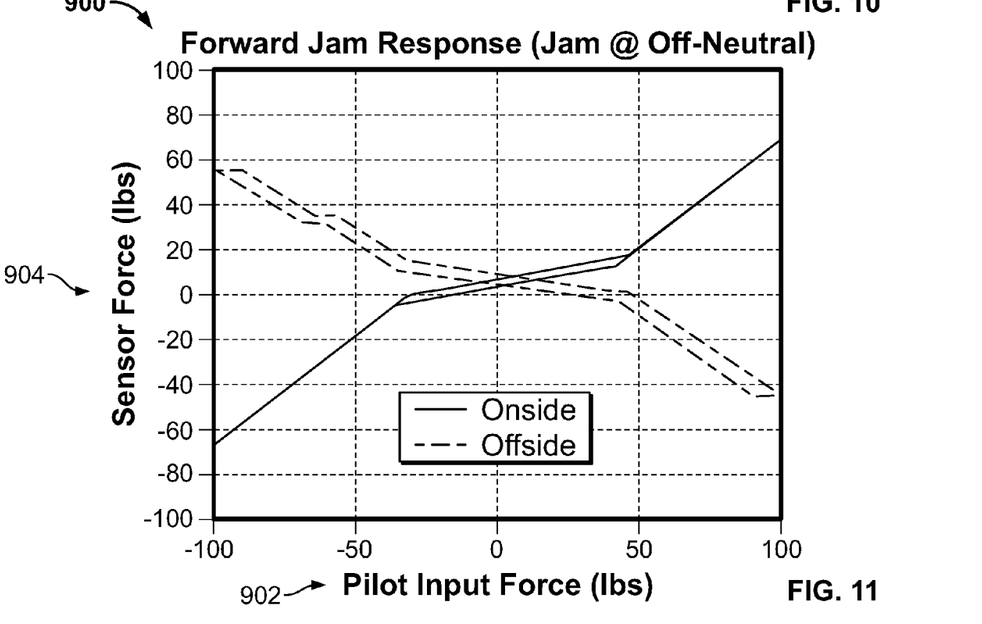

FIGS. 8-15 are graphs generated in connection with the examples disclosed herein. FIG. 8 is a graph 600 showing a normal operation response of the first and second sensors 204, 208 where the x-axis 650 corresponds to the input force value and the y-axis 652 corresponds to the sensor force. FIG. 9 is a graph 700 showing an aft jam response at neutral or off-neural of the first and second sensors 204, 208 where the x-axis 750 corresponds to the input force value and the y-axis 752 corresponds to the sensor force. FIG. 10 is a graph 800 showing a forward jam response at neutral of the first and second force sensors 204, 208 where the x-axis 802 corresponds to the input force value and the y-axis 804 corresponds to the sensor force. FIG. 11 is a graph 900 showing forward jam response off neutral of the first and second sensors 204, 208 where the x-axis 902 corresponds to the input force value and the y-axis 904 corresponds to the sensor force.

Figure 12:
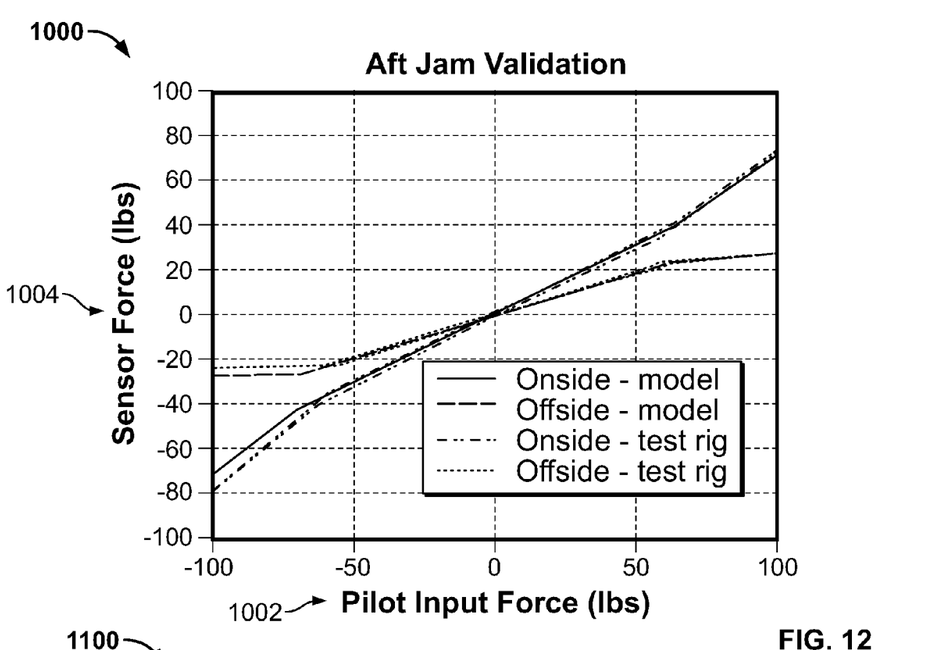
Figure 13:
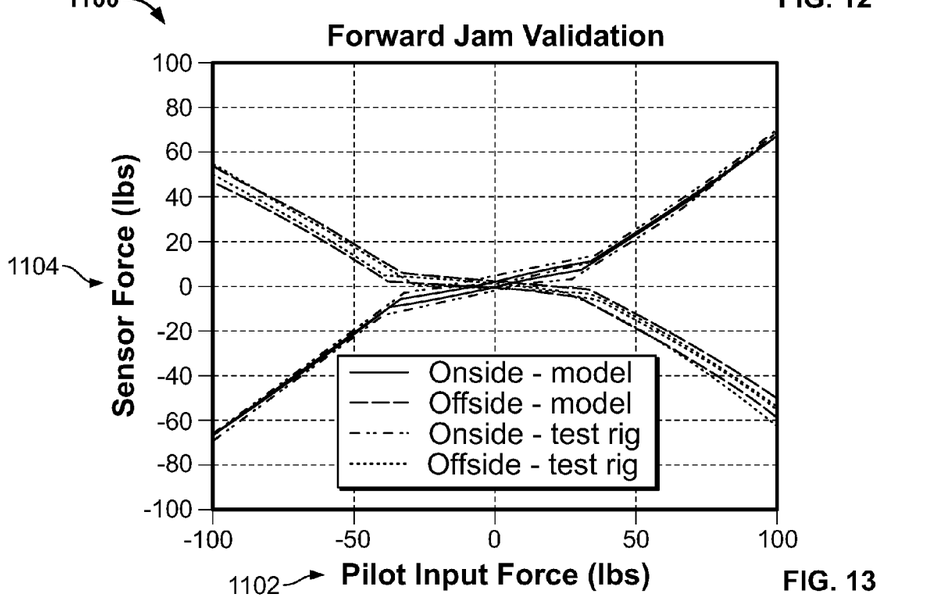

FIG. 12 is a graph 1000 showing the validation of the data obtained using a model-based design for aft jams and the data obtained using a factory and test rig for aft jams. Referring to FIG. 12, the x-axis 1002 corresponds to the input force value and the y-axis 1004 corresponds to the sensor force. FIG. 13 is a graph 1100 showing the validation of the data obtained using a model-based design for forward jams and the data obtained using a factory and test rig for forward jams. Referring to FIG. 13, the x-axis 1102 corresponds to the input force value and the y-axis 1104 corresponds to the sensor force.

Figure 14:
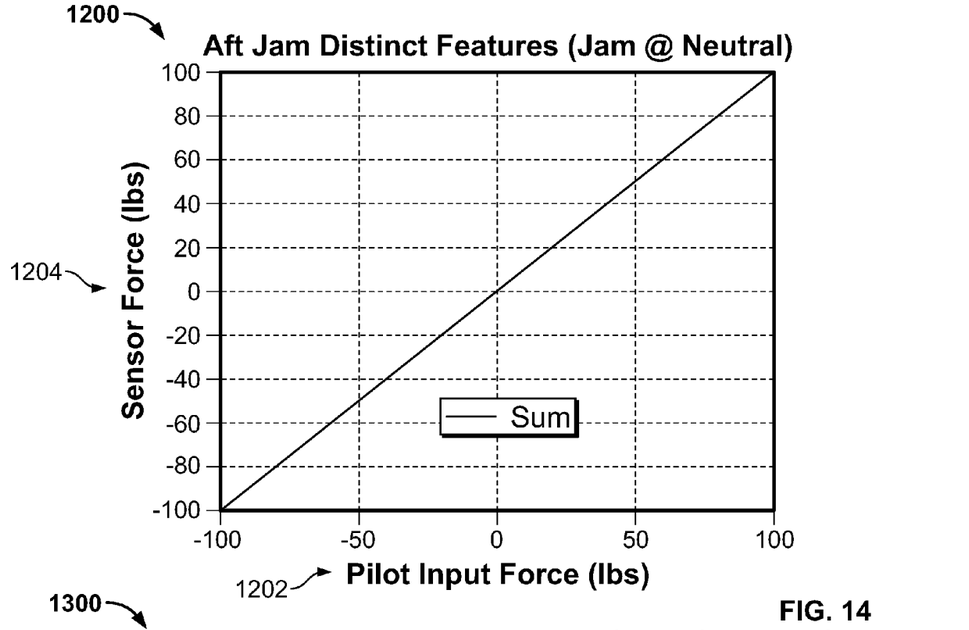

FIG. 14 is a graph 1200 that shows the distinct features observed for aft jams at neutral where the x-axis 1202 corresponds to the input force value and the y-axis 1204 corresponds to the sensor force. As illustrated in the graph 1200, for aft jams, the sensor sum may be approximately equal to the input force.

Figure 15:
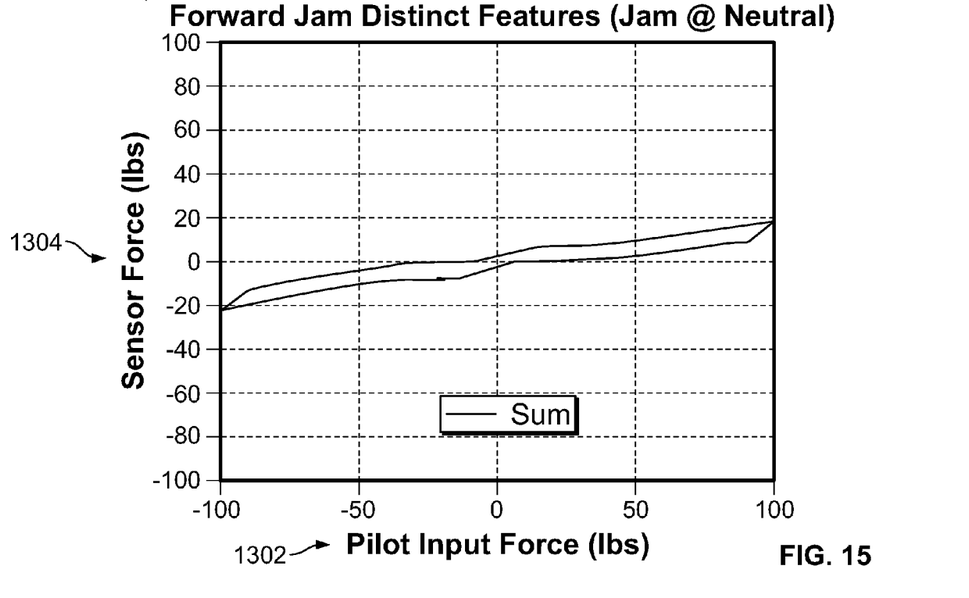

FIG. 15 is a graph 1300 that shows the distinct features observed for forward jams at neutral where the x-axis 1302 corresponds to the input force value and the y-axis 1304 corresponds to the sensor force. As illustrated in the graph 1300, for forward jams, the sensor sum may be approximately equal zero.

Figure 16:
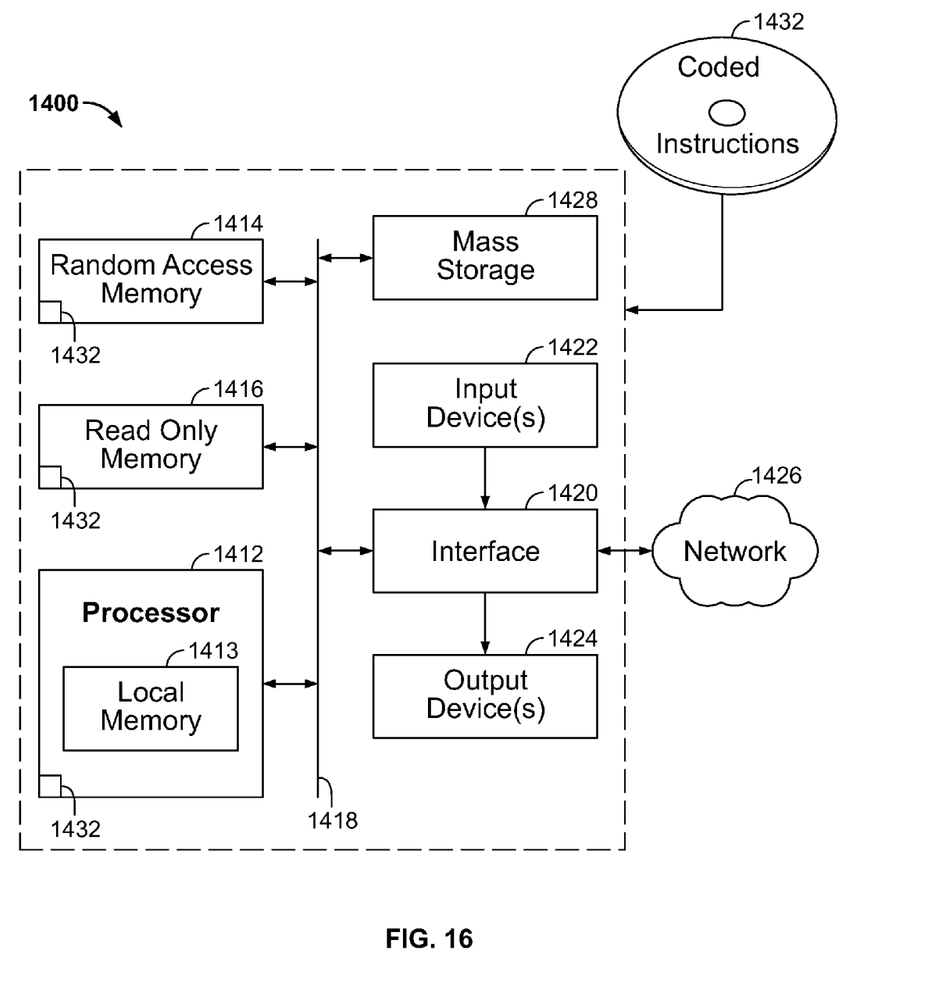
FIG. 16 is a processor platform that may be used to implement the examples described herein.

FIG. 16 is a block diagram of an example processor platform 1400 capable of executing the instructions of FIGS. 4-7 to implement the mechanical elevator control system of FIG. 2. The processor platform 1400 can be, for example, a server, a personal computer, a mobile device (e.g., a cell phone, a smart phone, a tablet such as an iPad™), a personal digital assistant (PDA), an Internet appliance, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

Coded instructions 1432 to implement the method of FIG. 4 may be stored in the mass storage device 1428, in the volatile memory 1414, in the non-volatile memory 1416, and/or on a removable tangible computer readable storage medium such as a CD or DVD.

From the foregoing, it will be appreciated that the above disclosed methods, apparatus and articles of manufacture enables jam locations to be differentiated and, thereafter, uses pre-determined instructions (e.g., force sensing control law) to control the aircraft accordingly. The examples disclosed herein enable a significant weight and cost reduction as compared to some known approaches. Additionally or alternatively, the examples disclosed herein use sensors (e.g., the force sensors) for multiple system functions.

As set forth herein, an example method includes determining first and second input force values and, based a first summation of the first and second input force values, determining a location of an elevator jam in a mechanical elevator control system of an aircraft. In some examples, determining the approximate location of the elevator jam includes determining if the first summation is approximately equal to or above a predetermined value. In some examples, the elevator jam includes an aft jam if the first summation is approximately equal to or above a predetermined value. In some examples, the approximate location includes a forward jam or an aft jam.

In some examples, the method also includes, based on the elevator jam being the aft jam, determining a direct lift control command to mitigate the elevator jam. In some examples, based on the direct lift control command, commanding wing spoilers of the aircraft to mitigate the elevator jam. In some examples, the direct lift control command is based on the first summation. In some examples, the elevator jam includes a forward jam if the first summation is approximately less than a predetermined value. In some examples, based on the elevator jam being the forward jam, enabling a forward jam override device to mitigate the elevator jam. In some examples, the method also includes using the first summation as an input force value when the elevator jam is an aft jam. In some examples, the elevator jam being associated with a forward jam includes the first summation being approximately zero or less than a predetermined value.

An example apparatus includes a mechanical elevator control system including a first sensor and a second sensor. The apparatus also includes a processor to, based on data from the first and second sensors, determine first and second input force values and, based a first summation of the first and second input force values, determine an approximate location of an elevator jam in a mechanical elevator control system of an aircraft. In some examples, the processor is to identify the elevator jam as being an aft jam if the first summation is approximately equal to or above a predetermined value. In some examples, when the processor identifies the elevator jam as being an aft jam, the processor is to determine a direct lift control command to mitigate the elevator jam. In some examples, based on the direct lift control command determined, the processor is to command the wing spoilers of the aircraft to mitigate the elevator jam. In some examples, the processor is to determine the direct lift control command based on the first summation. In some examples, the processor is to identify the elevator jam as being a forward jam if the first summation is approximately less than a predetermined value. In some examples, when the processor identifies the elevator jam as being a forward jam, the processor is to enable a forward jam override device to mitigate the elevator jam.

An example method includes determining first and second input force values and, based on a summation of the first and second forces being greater than or less than a predetermined value, determining an approximate location of an elevator jam in a mechanical elevator control system of an aircraft. The example method also includes, based on the elevator jam being an aft jam, determining a direct lift control command based on the first summation, a minimum predetermined value, and a maximum predetermined value.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining first and second values;
   based on the values, determining a location of a jam in a flight control system of an aircraft, the location of the jam is determined based on a first summation of the first and second values.

2. The method of claim 1, wherein the flight control system comprises an elevator control system, a lateral control system, or a directional control system.

3. The method of claim 1, wherein the first and second values comprise first and second input force values associated with control columns of the flight control system.

4. The method of claim 1, wherein the flight control system comprises a mechanical control system or a fly-by-wire control system.

5. The method of claim 1, wherein determining the location of the jam comprises determining if the first summation is approximately equal to or above a predetermined value.

6. The method of claim 1, wherein the jam comprises an aft jam if the first summation is approximately equal to or above a predetermined value.

7. The method of claim 1, wherein the jam comprises a forward jam if the first summation is approximately less than a predetermined value.

8. The method of claim 7, wherein based on the jam being the forward jam, enabling a forward jam override device to mitigate the jam.

9. The method of claim 1, wherein the jam comprises an elevator jam.

10. A method, comprising:
    determining first and second values;
    based on the values, determining a location of a jam in a flight control system of an aircraft, the jam comprises an elevator jam, and
    based on the elevator jam being an aft jam, determining a direct lift control command to mitigate the elevator jam.

11. The method of claim 10, further comprising, based on the direct lift control command, commanding wing spoilers of the aircraft to mitigate the elevator jam.

12. An apparatus, comprising:
    an elevator control system comprising a first sensor and a second sensor; and
    a processor to:
      based on data from the first and second sensors, determine first and second input force values;
      based on a first summation of the first and second input force values, determine an approximate location of an elevator jam in an elevator control system of an aircraft.

13. The apparatus of claim 12, wherein the processor is to identify the elevator jam as being an aft jam if the first summation is approximately equal to or above a predetermined value.

14. The apparatus of claim 12, wherein when the processor identifies the elevator jam as being an aft jam, the processor is to determine a direct lift control command to mitigate the elevator jam.

15. The apparatus of claim 14, wherein, based on the direct lift control command determined, the processor is to command the wing spoilers of the aircraft to mitigate the elevator jam.

16. The apparatus of claim 12, wherein the processor is to identify the elevator jam as being a forward jam if the first summation is approximately less than a predetermined value.

17. The apparatus of claim 12, wherein when the processor identifies the elevator jam as being a forward jam, the processor is to enable a forward jam override device to mitigate the elevator jam.

* * * * *